US008106296B2

(12) United States Patent
van Tiel et al.

(10) Patent No.: US 8,106,296 B2
(45) Date of Patent: Jan. 31, 2012

(54) ELECTRICAL COMPONENT COMPRISING A HOTMELT ELEMENT

(75) Inventors: Gert van Tiel, Vught (NL); Jan Van Tilburg, Oss (NL)

(73) Assignee: Tyco Electronics Nederland BV, 'S-Hertogenbosch (NL)

( * ) Notice: Subject to any disclaimer, the term of this patent is extended or adjusted under 35 U.S.C. 154(b) by 0 days.

(21) Appl. No.: 12/930,192

(22) Filed: Dec. 30, 2010

(65) Prior Publication Data

US 2011/0162882 A1 Jul. 7, 2011

(30) Foreign Application Priority Data

Jan. 4, 2010 (EP) .................................... 10075005

(51) Int. Cl.
*H02G 15/02* (2006.01)

(52) U.S. Cl. ................... 174/70 R; 174/84 R; 174/88 R

(58) Field of Classification Search ................ 174/70 R, 174/74 R, 78, 84 R, 88 R
See application file for complete search history.

(56) References Cited

U.S. PATENT DOCUMENTS

| | | | | |
|---|---|---|---|---|
| 4,871,319 | A * | 10/1989 | Babow | 439/77 |
| 7,798,853 | B2 * | 9/2010 | Shi et al. | 439/607.58 |
| 2001/0053624 | A1 | 12/2001 | Medina | |
| 2007/0111597 | A1 | 5/2007 | Kondou | |
| 2009/0325397 | A1 | 12/2009 | Mizukami | |

OTHER PUBLICATIONS

European Patent Office, Extended European Search Report for EP 10075005.8, Jun. 14, 2010, 4 pages.

* cited by examiner

*Primary Examiner* — William Mayo, III
(74) *Attorney, Agent, or Firm* — Baker & Daniels LLP

(57) ABSTRACT

An electrical component having at least one cable element, at least one solder joint, at least one hotmelt element and at least one substrate element. The cable element is connected with the substrate element by the solder joint. The at least one solder joint is not embedded in the hotmelt element. Preferably, the solder joint is free from the hotmelt material of the hotmelt element.

5 Claims, 2 Drawing Sheets

ELECTRICAL COMPONENT COMPRISING A HOTMELT ELEMENT

BACKGROUND

The invention relates to an electrical component comprising at least one cable element, at least one solder joint, at least one hotmelt element and at least one substrate element, the cable element comprising at least one conducting member, the substrate element comprising at least one electric member that is electrically connected to the conducting member via the at least one solder joint.

An electrical component having the above features is known from the prior art, e.g. for the transmission of data at high data rates up to 1 Gbit/s (gigabits per second). The substrate element is usually a printed circuit board that comprises active or passive, electrical or electronic parts such as conductors, integrated circuits, resistors, receivers, transceivers, transistors, to name but a few. The cable element may comprise several, or one, conducting members e.g. in the form of electrically conductive leads. The electric members of the substrate element are connected to the conducting members by solder joints. The substrate element may be equipped with additional connector elements or constitute a connector such as a male or female plug.

The hotmelt element in the prior art surrounds the cable and the conducting members in the vicinity of the substrate element and extends over a large part of the substrate element including the solder joints. The function of the hotmelt element is to provide an additional, force-absorbing connection between the cable element and the substrate element so that forces acting on the cable element and/or the substrate element are not guided solely through the solder joint. By embedding the substrate element and the cable element, and possibly the conducting members, into the hotmelt element, the mechanical connection between the substrate element and cable is enforced. Further, the distance between the conducting members is fixed. Cross-talk between the conducting members is reduced. More significantly, the insulation of the conducting members cannot be worn off due to bending loads to the solder joint.

The known electrical components are manufactured by casting the molten hotmelt material indifferently over the substrate element, the solder joint and the cable in a tool. For this, the components of the electrical component are put into cavities of a tool, in which the hotmelt material is applied.

The hotmelt material may be a thermoplastic material, especially a hotmelt adhesive or hot glue, which, in the hardened state, forms an integral, non-sticky solid body, but in the molten state exhibits cohesive or adhesive properties. It is formed in the hotmelt cavity by supplying molten hotmelt material thereinto.

In the known electrical components, the transmissibility of very high frequencies from the conducting member to the electric member or, generally, from the cable element to the substrate element, decreases significantly at very high frequencies. This is an obstacle in the ongoing drive to use ever higher data transmission rates.

It is therefore an object of the invention to provide an electrical component, as well as a tool and method for manufacturing the same, that is capable of tolerating high mechanical stresses and, at the same time, has an improved performance at very high data rates, say beyond five Gbit/s without leading to increased manufacturing costs.

SUMMARY

This object is achieved according to the invention for an electrical component having the initially recited features in that the at least one solder joint is not embedded in the hotmelt element.

Surprisingly, this solution leads reliably to very high data rates of 5 Gbits/s and beyond. In particular, data transmission rates of 10 gigabit per second can be achieved with not other changes applied to the previously known electric components. It is believed that in the known electrical components, the covering of the solder joints by the hotmelt material has negative implications on the impedance and cross-talk at very high frequencies, which eventually may reduce the achievable data rates.

The solution according to the invention may be carried further. In the following, improved embodiments and their advantages are briefly described. The additional features are associated with various advantages and may be arbitrarily combined depending on the need for the respective advantage in a particular application, as becomes clear from the following.

According to a preferred embodiment, the solder joints are not covered by and are in particular free from any hotmelt material from which the hotmelt element is made to further improve the transmission characteristics of the electric component. It appears that even small amounts of hotmelt material on the solder joints affect the maximum data rates through the electrical component.

As another example, the hotmelt element may be formed as a unitary block in order to allow for a simple design of the hotmelt cavity and consequently a simplified flux of the molten hotmelt material within the mold.

In some configurations, the at least one solder joint may not extend up to a rearward end of the substrate element, wherein the rearward end faces in the direction of the hotmelt element or cable element, respectively. Rather, the solder joint may be located at a distance from the rearward end of the substrate element. To avoid that, in such a case, the conducting member freely bridges the distance between the forward end of the substrate element and the solder joint, the hotmelt element may extend into a space between the at least one conducting member and the substrate element. This stabilizes the conducting member. The hotmelt material may be automatically drawn in this space during the manufacturing process due to capillary forces. Also, the conducting member or the conducting members may be embedded within the hotmelt element up to the solder joint associated with the respective conducting member or members.

In another embodiment, the rearward end of the substrate element may abut the at least one hotmelt element. In this way, the connection between the cable element and the substrate element may be further strengthened, as the abutment limits the moveability of the substrate element relative to the hotmelt element.

In order to further improve the connection between the cable element and the substrate element, the rearward end of the substrate element may be bonded to the hotmelt element according to another embodiment. The bonding may be established by cohesive or adhesive forces of the hotmelt material if it comes into contact with the substrate element in the molten state.

Alternatively or additionally to the above measures, the rearward end of the substrate element may extend into and/or be embedded in the hotmelt element. Thus, the contact area between the hotmelt element and the substrate element is increased which leads to higher bonding forces.

In another embodiment, the hotmelt element may extend underneath the substrate element on its lower surface opposite the "upper" surface on which the at least one solder joint is situated, beyond the location of the solder joint. On this surface, the forward end of the hotmelt element may even extend beyond the location of the at least one solder joint on the upper surface. The forward end of the hotmelt element on the upper side, where the solder joint is situated, however, does not extend over the at least one solder joint. This measure increases the surface area of the substrate element that is in contact with the hotmelt material even more. Consequently, the mechanical strength of the connection between the two is further improved without compromising data transmissibility.

In the following, the electrical component according to the invention is exemplarily described with reference to the accompanying drawings. It is to be understood that this description is of purely exemplary nature and is not meant to limit the invention. In particular, any feature described in the context of the embodiments may be omitted or arbitrarily combined with any other features as has been described above.

DETAILED DESCRIPTION

Figure 1:
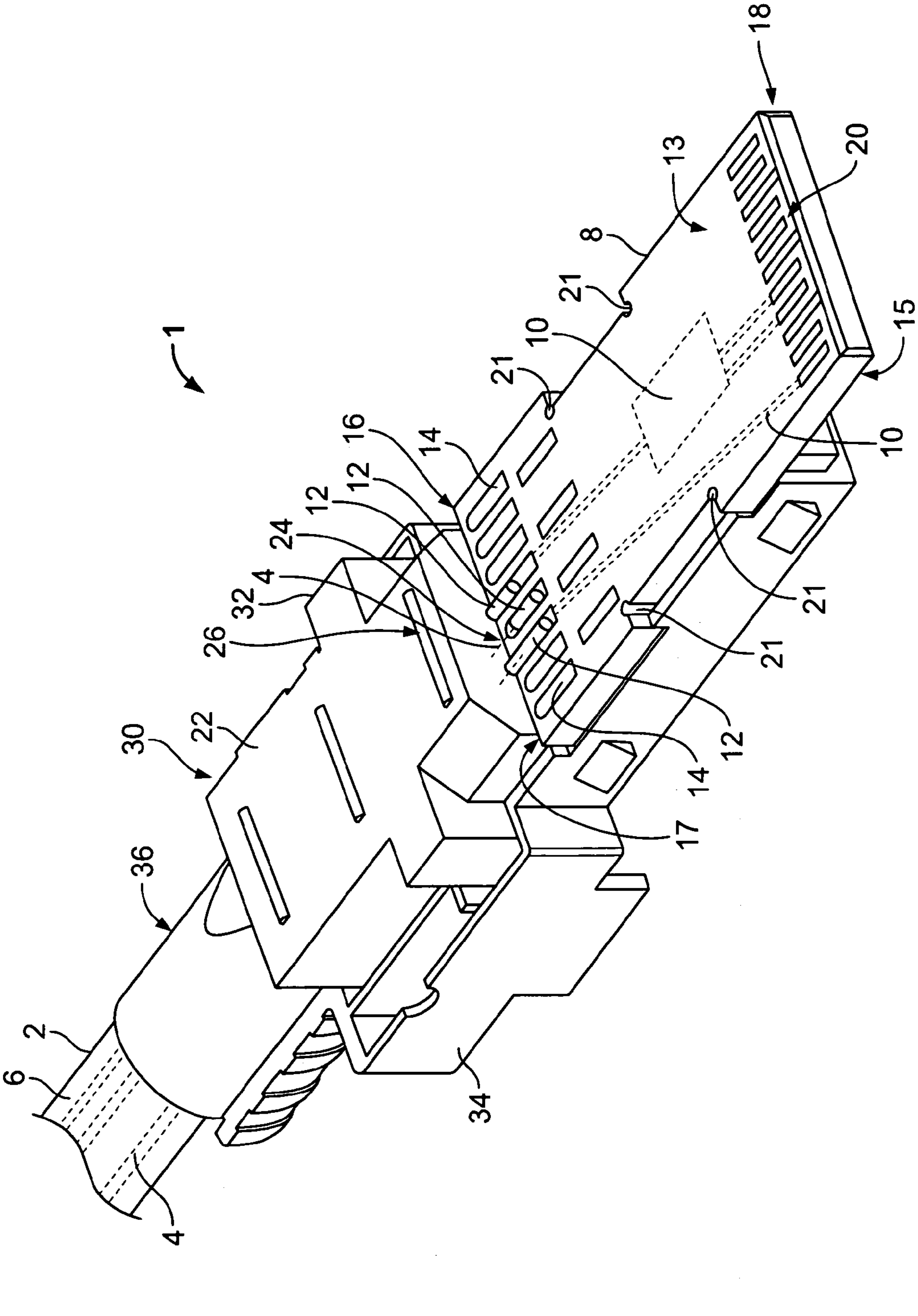
FIG. 1 shows a schematic perspective view of an electrical component according to the invention.

The configuration of an electrical component 1 according to the invention is explained with reference to FIG. 1.

The electrical component 1 comprises at least one cable element 2, which in turn comprises at least one conducting member 4 such as a lead of conductive material. Usually, the at least one conducting member is enclosed in an insulation cladding 6, which also surrounds an electromagnetic shield, not shown, to shield off electromagnetic radiation from the conducting members 4.

The cable element 2 is mechanically and electrically connected to a substrate element 8. This connection may take place by connecting the at least one conducting member 4 with at least one electric member 10 of the substrate element, in particular by a solder joint 12 on an upper surface 13 of the substrate element 8. The number of solder joints 12 corresponds to the number of conducting members 4 that are connected to the substrate element 8.

In the following, the "forward" direction designates a direction extending from the cable element 2 to the substrate element 8; the "rearward" direction points from the substrate element 8 to the cable element 2.

The solder joint 12 is created by e.g. placing an end of the conducting member 4 over a solder pad 14 and applying solder material on the solder pad 14 so that the solder material encompasses the end of the conducting member 4 which is exposed after the insulation 6 and the shielding have been peeled away. If the solder material is hardened, it forms a drop-like bump on the substrate element 8 and is bonded both to the conducting member 4 and the solder pad 14. The solder joints 12 in FIG. 1 are all located on the upper surface 13 of the substrate element 8. The number of conducting members 10, solder joints 12 and solder pads 14 shown in FIG. 1 is for illustrative purposes only and may depend on the specific application. Therefore, in the following these expressions are used in the plural form or in conjunction with the expression "at least one". A lower surface 15 of the substrate element 8 may be free of any solder joints.

The solder pad 14 is preferably made of conductive material and constitutes a part of the electric members 10 of the substrate element 8. Other electric members 10, to which the conducting member 4 may be directly or indirectly connected are active or passive, electric or electronic members such as leads, integrated circuits, resistors, transistors, dials and so on and any combination thereof. The electric members 10 are supported by the substrate element 8, which may be a printed circuit board, a rigid or flexible foil equipped with electric members 10, or an injection molded structure, in which the electric members 10 are embedded, and the like.

As can be seen from FIG. 1, the solder joints 12 are of irregular shape and size, and may extend up to a rearward end 16 of the substrate element 8, the rearward end 16 has a rearward face 17 pointing in the direction of the cable element 2. Furthermore, the position of the solder joints 12, and of the conducting members 10 within the solder joints may vary.

A forward end 18 of the substrate element 8 faces away from the cable element 2 and may be provided with a connecting section 20, which allows an electric or electronic connection to other electrical or electronic equipment. In particular, the connecting section 20 may be plugged into a mating connector (not shown) to transmit data at data transmission rates higher than five gigabit per second, preferably higher than ten gigabits per second.

The substrate element 8 may be provided with at least one positioning guide 21, e.g. shaped as an opening at one of the edges, to allow exact positioning during the production of the hotmelt element 22.

The rearward end 16 with its rearward face 17 abuts a hotmelt element 22, which is manufactured from a thermoplastic material, preferably a thermoplastic glue such as a hotmelt or a hot glue. The hotmelt element 22 is interposed between the cable element 2 and the substrate element 8. It surrounds at least one of the cable element 2 and the at least one conducting member 4.

Preferably, a hotmelt material is used for the hotmelt element 22 that exhibits bonding properties in the molten, but not in the solid state, such that the rearward end 16 of the substrate element 8 is cohesively or adhesively bonded to the hotmelt material. From this, a strong mechanical connection between the hotmelt element 22 and the substrate element 8 results.

The hotmelt element may extend into a space 24 between a conducting member 4 and the substrate element 8 up to the solder joint 12, to enforce the part of the conducting member 4 that extends from a forward end 26 of the hotmelt element 22 to the respective solder joint. In another embodiment, this part may be completely embedded in the hotmelt element 22 which extends across the substrate element 8 up to the solder joint 12.

To achieve very high data transmission rates, it is important that the solder joints 12 are not embedded in the hotmelt element 22 and preferably not even covered by the hotmelt material. Thus, the forward end 26 of the hotmelt element 22 is located before the solder joint 12 at least on the upper surface 13. If solder joints 12 are situated on both sides of the substrate element 8, then the forward end 26 of the hotmelt element is located before the solder joints 12 on both sides. The expression "before" refers to the forward direction, i.e. looking from the cable element 2 to the forward end 18 of the substrate element 8.

In the embodiment of FIG. 1, the hotmelt element 22 may be regarded as having two sections of distinct geometric shape, the two sections being, however, part of an integrally cast body: A forward section 30 of the hotmelt element 22 is roughly brick-shaped and may comprise protrusions 32 in order to allow a positive lock and secure positioning in e.g. a housing 34 of which only one lower half is shown in FIG. 1 and into which the integral assembly comprising the cable element 2, hotmelt element 22 and substrate element 8 is put. The other half of the housing (not shown) may be clipped or bonded to the lower half of the housing 34. The housing 34 may further be received in a shielding shell (not shown) made of conductive material, which may be grounded.

A rearward section 36 of the hotmelt element 22 may be of at least roughly cylindrical shape and extend in the forward-rearward direction. The sectional design allows for a decreased rigidity at the entry of the cable element 2 into the hotmelt element 22 relative to the forward section 22. This minimizes shear stresses on the cable element 22 at the transition region between the cable element 2 and the hotmelt element 22.

Figure 2:
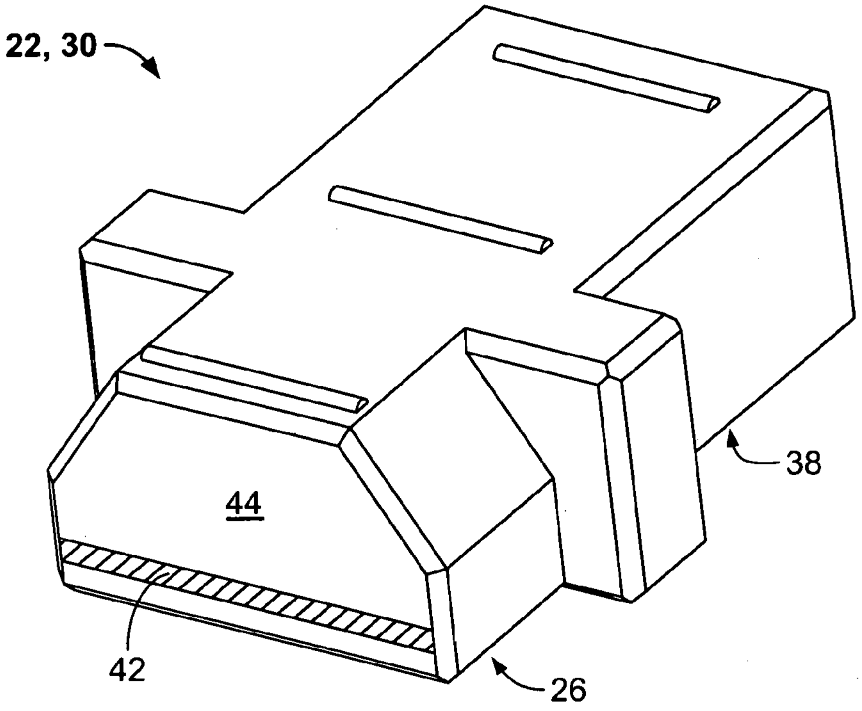
FIG. 2 shows a schematic perspective view of a hotmelt element used in the embodiment of FIG. 1.

FIG. 2 shows the front section 30 of the hotmelt element 22 as used in the embodiment of FIG. 1. A bottom surface 38 of the hotmelt element 22 is substantially planar and aligned and possibly offset with a lower surface 15 (FIG. 1) of the substrate element 8. A bonding region 42, where the substrate element 8 is bonded to a forward face 44 or the forward end 26 of the hotmelt element 22 is shown as a hashed region in FIG. 2. At this location, the rearward end 16 of the substrate element 8 (FIG. 1) may even extend for a short distance into the hotmelt element 22 to increase the bonding effect. However, it is important that the hotmelt element 22 does not reach or cover the solder joints 12, as discussed above.

Figure 3:
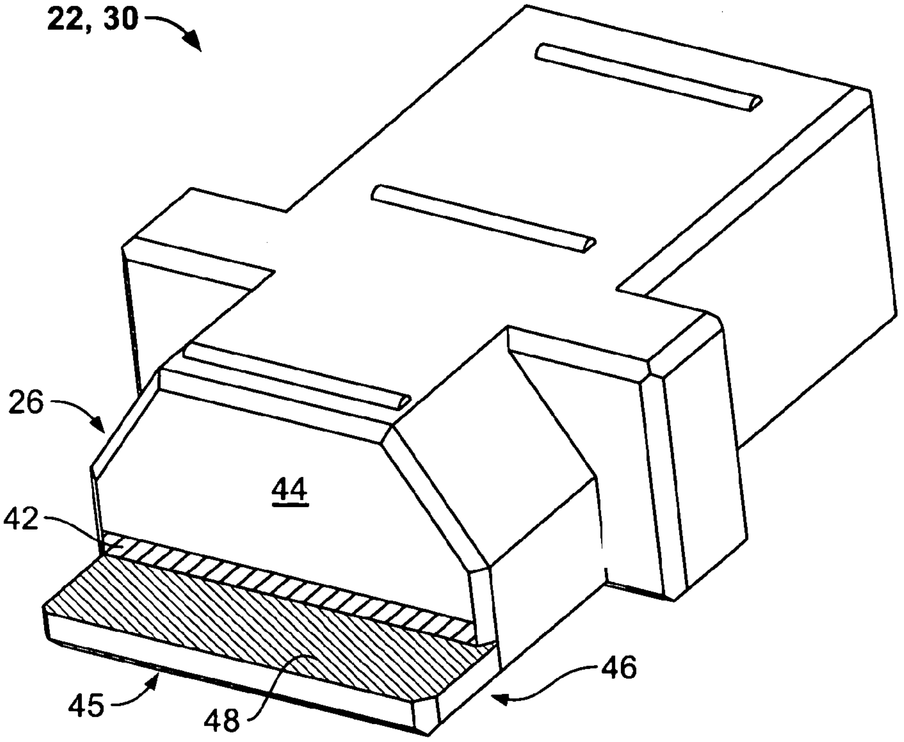
FIG. 3 shows a schematic perspective view of another embodiment of a hotmelt element for an electrical component according to the invention.

FIG. 3 shows another embodiment of the front section 30 of hotmelt element 22. The rearward section 36 may be as described with reference to FIG. 1. The front section 30 of the hotmelt element 22 of FIG. 3 differs from the one shown in FIG. 2 by extending underneath the substrate element 8 along its lower surface 15. If there are no solder joints 12 on the lower surface 15 of the substrate element 8, or if the at least one solder joint 12 on the lower surface 15 is located closer to the forward end 18, a lower forward end 45 of the hotmelt element 22 may even extend beyond the location of the solder joints 12 on the upper surface 15. Thus, the hotmelt element 22 may form a shoulder 46, on which the substrate element 8 rests. This increases significantly the bonding area between the substrate element 8 and the hotmelt element 22: In addition to the bonding region 42 for the rearward face 17 of the substrate element 8, an additional bonding region 48 for a part of the lower surface 15 of the substrate element 8 is available. The bonding regions 42 and 48 are shown as hashed regions in FIG. 3. Again, the rearward end 16 of the substrate element 8 may extend into the hotmelt element 22.

Of course, a shoulder similar to the shoulder 46 may also be provided for the upper surface 13 of the substrate element 8 in addition or alternatively to the shoulder 46, if solder joints 12 are located only on the lower surface 15 for the substrate element 8, or if the solder joints 12 on the upper surface 13 are sufficiently remote from the rearward face 16 of the substrate element 8.

The invention claimed is:

1. Electrical component comprising at least one cable element, at least one solder joint, at least one hotmelt element and at least one substrate element, where a rearward end of the substrate element abuts the hotmelt element, the rearward end facing in the direction of the cable element, the cable element comprising at least one conducting member, the substrate element comprising at least one electric member that is electrically connected to the conducting member via the at least one solder joint, wherein the at least one solder joint is not embedded in the hotmelt element.

2. Electrical component according to claim 1, wherein the hotmelt element is made from a hotmelt material, and the solder joints are not covered by the hotmelt material.

3. Electrical component according to claim 1, wherein the hotmelt element extends into a space between the at least one conducting member and the substrate element.

4. Electrical component according to claim 1, wherein a rearward end of the substrate element is bonded to the hotmelt element, the rearward end facing the direction of the cable element.

5. Electrical component according to claim 1, wherein a rearward end of the substrate element extends into the hotmelt element, the rearward end facing in the direction of the cable element.

* * * * *